Aug. 17, 1937. C. R. KELTY Re. 20,471

MOTOR CONTROLLING DEVICE

Original Filed March 28, 1925 4 Sheets-Sheet 1

Inventor:
Charles R. Kelty
by Emery, Booth, Janney & Varney
Attys

Aug. 17, 1937. C. R. KELTY Re. 20,471

MOTOR CONTROLLING DEVICE

Original Filed March 28, 1925 4 Sheets-Sheet 2

Inventor:
Charles R. Kelty,
by Emery, Booth, Janney & Varney,
Attys

Aug. 17, 1937. C. R. KELTY Re. 20,471

MOTOR CONTROLLING DEVICE

Original Filed March 28, 1925 4 Sheets-Sheet 3

Inventor:
Charles R. Kelty.
by Emery, Booth, Janney & Varney,
Attys

MOTOR CONTROLLING DEVICE

Original Filed March 28, 1925 4 Sheets-Sheet 4

Inventor:
Charles R. Kelty
by Emery, Booth, Janney & Varney
Attys

Reissued Aug. 17, 1937

Re. 20,471

UNITED STATES PATENT OFFICE 20,471

MOTOR CONTROLLING DEVICE

Charles R. Kelty, Milton, Mass., assignor to Cutler-Hammer, Inc., Milwaukee, Wis., a corporation of Delaware Original No. 1,908,763, dated May 16, 1933, Serial No. 19,183, March 28, 1925. Renewed September 29, 1932. Application for reissue June 21, 1937, Serial No. 149,502

23 Claims. (Cl. 137—139)

This invention aims to provide a simple and efficient motor controlling device.

In the accompanying drawings wherein is shown, merely for illustrative purposes, one embodiment of my invention:

The motor controlling device of the present invention is capable of a variety of uses but, for convenience, I have elected to show, in the accompanying drawings, its application to the control of a relatively large gate valve operating means.

Figure 1:
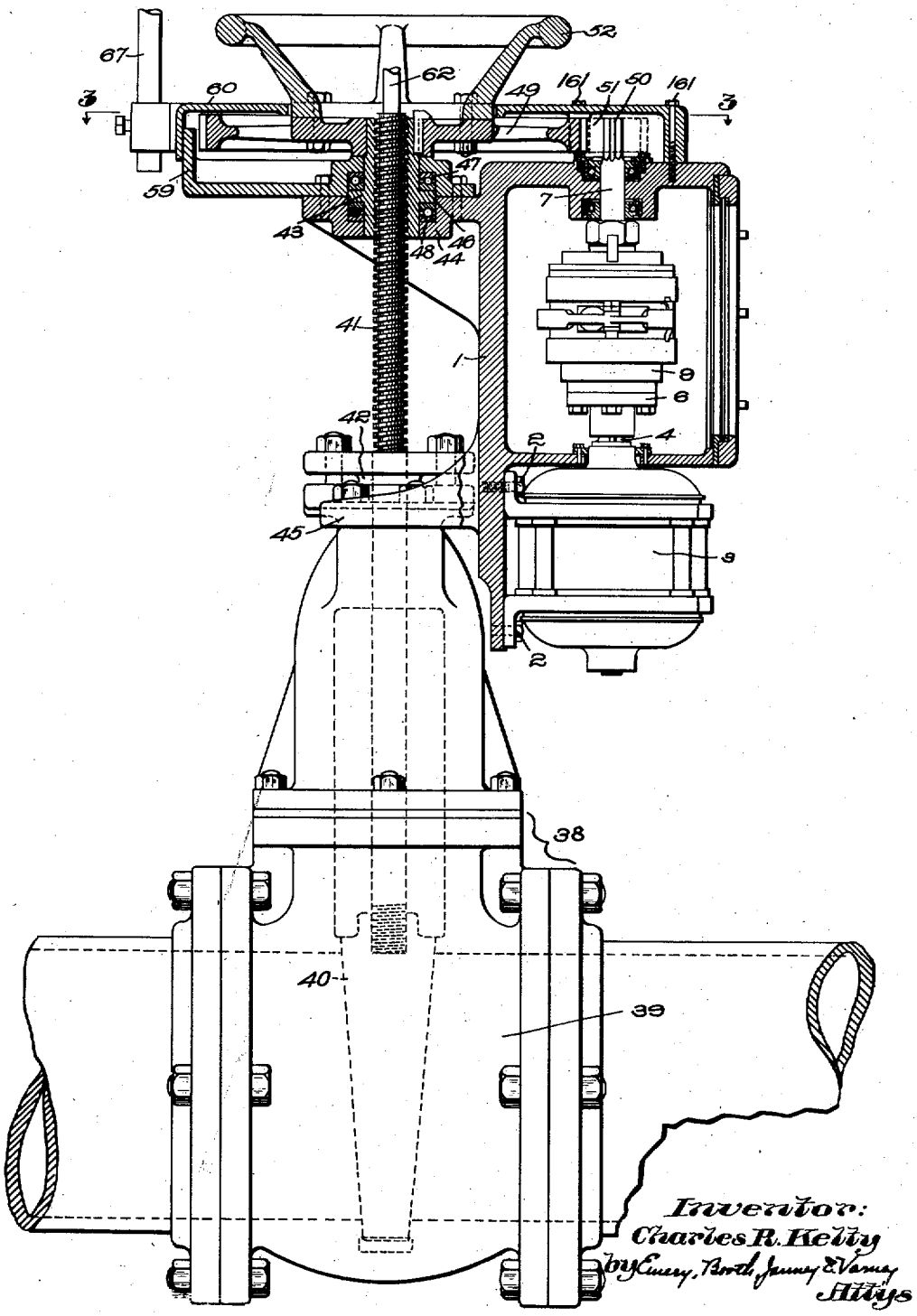
Fig. 1 is an elevation with certain parts in section illustrating the controller applied to a gate valve.
Figure 2:
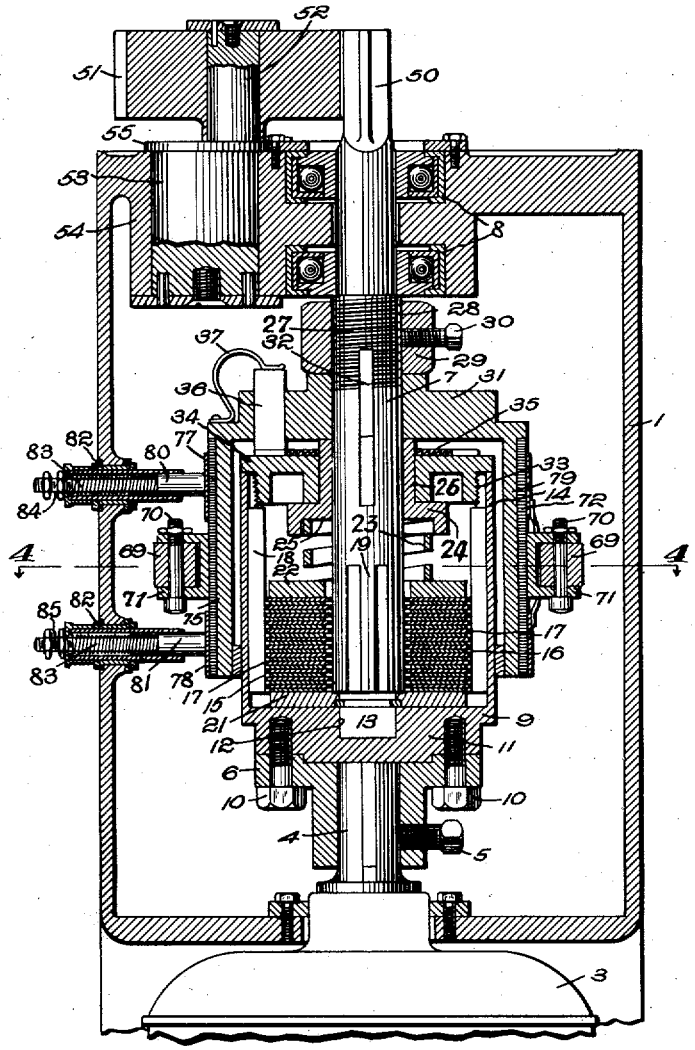
Fig. 2 is a vertical section of the controller shown on a somewhat larger scale than in Fig. 1.

In the drawings, referring particularly to Figs. 1 and 2, a casing 1 is provided for enclosing the operative parts of the controller and, mounted in close proximity to said casing by bolts 2, is an electric motor 3. The motor 3 has a shaft 4 to which is keyed and secured, by screw 5, a coupling member 6. A drive shaft 7 is journalled to rotate in the casing 1 in suitable bearings 8 herein arranged at the opposite end of the casing from said motor and desirably in axial alignment with the motor shaft 4 from which it herein is positively driven in one direction and frictionally driven in an opposite direction as will hereinafter be explained. The motor shaft 4 herein terminates in the coupling 6 and, interposed between said coupling and the drive shaft 7, is a clutch including a clutch body 9 secured by screws 10 to said shaft coupling. This clutch body has a relatively thick base 11 which is provided with a recess 12 to receive the shouldered end 13 of the drive shaft 7, thus insuring the proper alignment of the latter shaft with the shaft 4.

From the base 11, there extends, parallel with the shaft 7, a cylindrical shell 14 arranged to enclose the clutching devices, herein comprising metal disks including a series 15 constituting clutch body friction plates and a series 16, which alternate with and engage plates 15, constituting drive shaft friction plates. The friction plates 15 are somewhat larger than the plates 16 and the rims thereof which project beyond the latter are notched desirably at opposite points 17 to engage keys 18 shown most clearly in Figs. 2 and 4 set into the interior face of the shell 14 and permitting axial but not radial movements of said plates 15 relatively to said shell. Alternate plates 16 are, on the other hand, permitted at times, as when slipping of the clutch is desired, to rotate relatively to said shell but are prevented from rotating relatively to the shaft 7 by one or more keys 19 in said shaft and engaging notches 20 in the inner portion of the plates 16.

A friction plate thrust washer 21 is interposed between the series of friction plates and the clutch body 9 and a second thrust washer 22 is arranged against the opposite end of said series of friction plates and constitutes a seat for a spring 23. This spring encircles the drive shaft 7 and provides sufficient tension upon the several plates of the clutch to insure the transmission of rotary motion from the motor shaft 4 to said drive shaft 7 under normal conditions. Adjusting means are provided for varying the tension of the spring 23 as required, said adjusting means including a spring retainer 24 which is counterbored or recessed at 25 to receive and position said spring concentric with the shaft 7. The retainer 24 has a hub portion 26 bored to receive and fit the shaft 7.

The shaft 7 is screw-threaded at 27 and is provided with a nut or collar 29 correspondingly screw-threaded and arranged to be moved longitudinally of said shaft 7 to exert more or less pressure through said hub 26, spring retainer 24, and the spring 23 upon the disks of said clutch. A screw 30 is arranged in the nut 29 for the purpose of locking the same in its adjusted position on the shaft. Mounted upon the shaft, between the nut 29 and the hub 26, is a flanged hub 31 which is splined at 32 to provide for axial movement with respect to said shaft but preventing relative rotary movements therebetween.

The shell 14 is internally threaded, at its upper end, as at 33, and a cover 34 has screw-threaded engagement therewith for closing said upper end of the shell, said cover having rotatable engagement with the hub 26, and completely enclosing the friction elements of the clutch. As previously stated, the clutch, including the friction disks 15 and 16, is capable of operating the shaft 7 from the shaft 4 under normal conditions, but said clutch is desirably so adjusted and set that, when a predetermined resistance or obstruction to the operation of the shaft 7 is encountered, the shaft 7 is permitted to stop movement while the driving shaft thereof continues its operation for a time at least, as will be hereinafter explained.

With the arrangement thus far described, the shaft 7 will be frictionally operated in either direction by the reversing of the poles of the motor 3 but it is sometimes desirable to provide a positive drive in one direction and a friction drive in the opposite direction and, to this end, ratchet means are interposed between said shaft 4 and the shaft 7 which will positively impart motion to the latter in one direction but will slip when necessity requires during the operation of the shaft 4 in an opposite direction. Herein the ratchet means comprises a series of ratchet teeth 35 formed upon the outer face of the cover 34, which teeth are engaged by a pawl 36 carried by the flange 31 and yieldingly maintained in contact with the teeth by a spring 37, the inner end of said pawl being beveled to conform with the incline of the teeth 35.

It is obvious that the transmitting mechanism, herein interposed between the shaft 7 and the shaft 4, is capable of many uses but, for convenience, is herein applied to the operation of a gate valve 38 shown most clearly in Fig. 1. The valve 38 comprises a housing 39 within which a gate 40 is arranged for reciprocation from closed position, in dotted lines in said figure, to open position and vice versa.

Figure 3:
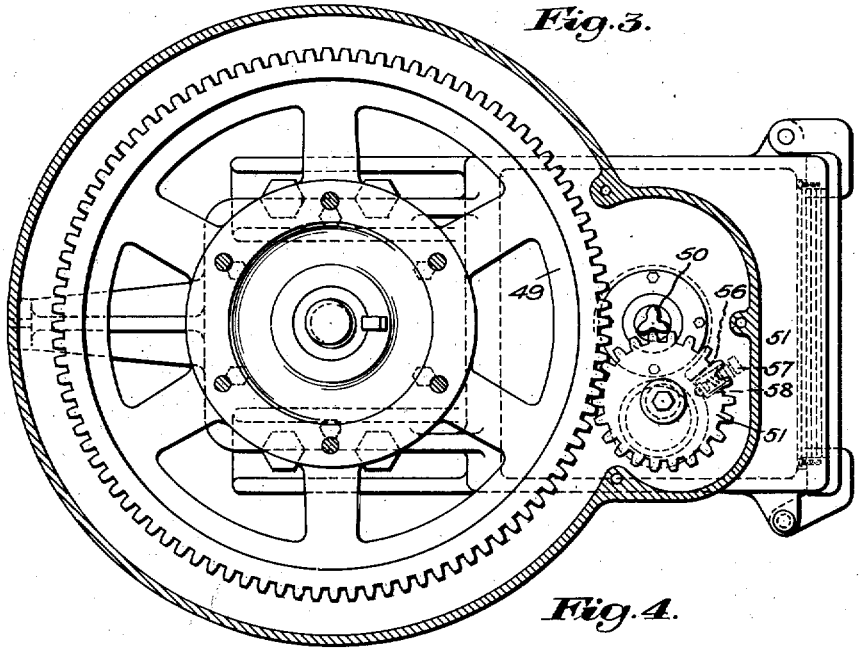
Fig. 3 is a sectional plan view taken on the line 3—3 of Fig. 1.

A valve stem 41 is connected with said gate to reciprocate within a suitable gland 42 which prevents leakage around said stem. The stem 41 is screw-threaded and engages a rotary nut 43 appropriately journaled in a bracket 44 extending herein from the housing 1 of the controller, said controller being, in turn, supported at 45 upon the valve housing 39. The nut 43 has an annular flange 46 engaging herein, ball bearing members 47 and 48 which constitute end thrust bearings to prevent axial movement of said nut. A gear 49 is secured to the sleeve 43 to rotate therewith and, in the example shown, motion is imparted to the gear 49 from the shaft 7 through a small pinion 50 and intermediate gear 51 shown most clearly in Figs. 1 and 3. The diameters of the gears of this train are of such a ratio as greatly to reduce the speed of the nut 43 and increase the power applied thereto whereby a relatively small motor will be able to effect the opening and closing operations of the gate 40.

The intermediate gear 51 is pivotally arranged upon the housing 1 to permit its withdrawal from engagement of one at least of the gears 50 and 49 when manual operation of the valve is desired, which manual operation may be effected through the operation of a hand wheel 52 secured to the upper face of the wheel 49. To facilitate movements of the intermediate gear 51 from its operative to its inoperative position and vice versa, said gear is rotatably mounted upon a stud 52 herein eccentrically connected with a shaft 53, which latter is rotatably mounted in a suitable bearing 54 formed in the housing 1.

The upper end of the shaft 53 is shouldered at 55 to form a seat for said shaft at the upper end of the bearing 54.

When manual operation of the valve is desired, the rotation of the shaft 53 causes the eccentric stud 52 to swing the gear 51 out of intermeshing relation with the pinion 50 and gear 49, where it may remain until further use thereof is required. The train of gears just described is suitably protected by gear coverings 59 and 60 secured together by appropriate screws such as 161 shown most clearly in Fig. 1.

By reason of the construction hereinbefore described, the motor 3, when operating in one direction, will effect a positive opening of the valve by acting through the coupling 6, clutch body 9, shell 14, top 34 and the aforesaid ratchet means, to operate the shaft 7 and, through the train of gears and nut 43, raise the gate 40. Upon reversing the operation of the motor 3, the nut 43 will be rotated in an opposite direction by means of said friction clutch including the friction disks 15 and 16 and, should any obstruction to the closing operation of said valve, be encountered, the friction disks will be permitted to slip without causing injury to the operating instrumentalities of the valve or to the valve itself. A similar slipping action of said clutch will likewise take place when the valve 40 reaches its seat, the pressure upon the friction plates being preferably sufficient to properly seat and close said valve but insufficient to cause any injury to said operating mechanism. During the opening of the valve 38, obstructions are seldom encountered; therefore it is safe to employ positive driving means including the pawl 36 and ratchet 35 which impart a hammerlike blow to the gate to start it from its seat.

When the valve has been opened to the extent desired, the motor 3 may be brought to a stop by opening the power circuit thereof but, for convenience, means have been provided for automatically throwing a switch when said gate reaches a predetermined position. In this connection means including a limit switch 61 are disposed in the path of a movable member of the device for example, the screw stem 41, to be engaged thereby, or as herein shown, by an extension 62 thereof when the gate 40 is opened a predetermined amount. The switch 61 is herein shown as embodying a movable self-closing switch member 63 adapted to engage contacts 64 and 65 and thereby close the electric circuit including said contacts and hereinafter more fully explained.

Figure 6:
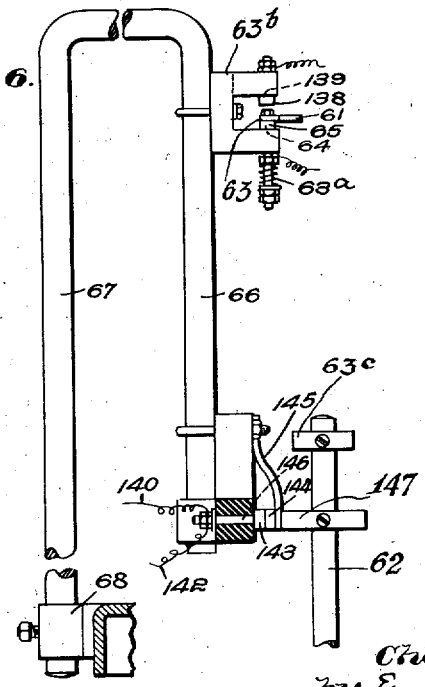
Fig. 6 is a detail side elevation of the limit switches and their supporting means.

The movable switch member 63 and the contacts 64 and 65, shown most clearly in Fig. 6, are herein secured to a depending portion 66 of an adjustable frame 67 vertically adjustable in a bracket 68 carried by the portion 60 of the gear covering. The member 63 is shown supported upon a spring depressed stud 63a mounted between the contacts 64 and 65 upon an insulating block 63b, the latter being adjustably secured upon the depending portion 66. The member 63 projects into the path of an adjustable abutment 63c adjustably secured to the extension 62. When the abutment 63c is approaching the limit of its valve opening movement, it is arranged to engage and raise the switch member 63, thus breaking connection between the switch member 61 and contacts 64 and 65 and stopping the motor 3.

To close the valve, operation of the motor 3 is desirably reversed and, when this reverse movement is started, the clutch, including the disks 15 and 16, is brought into play to revolve the nut 43 in a reverse direction and thus start the valve stem 41 on its closing movement. The initial closing movement of the stem 41 permits the switch 61 to close in readiness to be acted upon during the next opening operation thereof.

To initiate the starting operation of the motor 3 in opening or closing the valve, starting switches are preferably provided which may be manually held temporarily closed but, in order to render the device automatic, at least as to the stopping of the motor when certain conditions arise, means are provided whereby, when the motor has reached a predetermined speed, other means are set into operation which maintain the motor circuit closed until either the end of the valve stroke is reached or obstructions are encountered.

Figure 4:
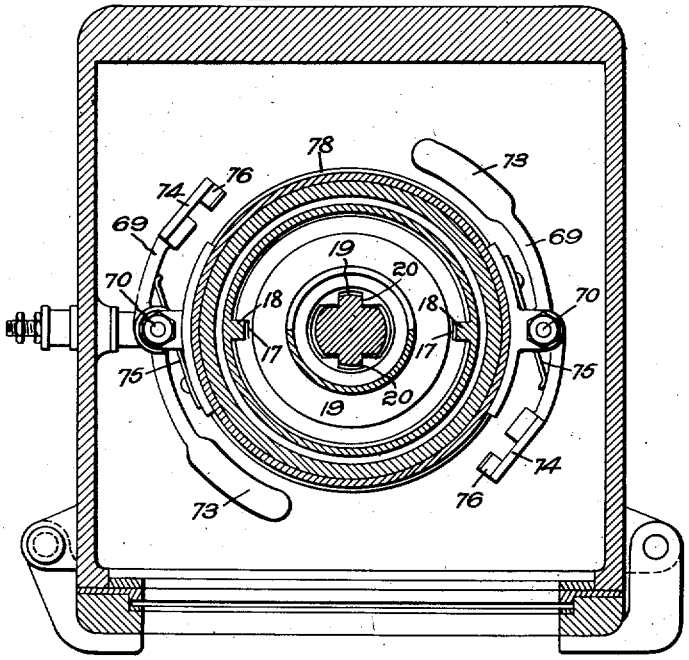
Fig. 4 is a plan section taken on the line 4—4 of Fig. 2.

To this end, I employ centrifugal circuit closing means including herein two levers 69, shown most clearly in Figs. 2 and 4. These levers are pivotally secured at 70 in brackets 71 connected to a sleeve 72 herein forming a part of the flange 31 which surrounds the clutch casing or sleeve 14. The levers 69 have weighted ends 73 arranged upon one side of the pivots 70 and switch arms 74 arranged at the opposite sides of said pivots.

Springs 75 are interposed between the levers 69 and said sleeve and normally retain the weights 73 in their contacted or inner positions but, upon rotation of said sleeve, the weights 73 are thrown outwardly by centrifugal force against the action of the spring 75 and cause switch blades 76, carried by the arms 74, to contact with circular bands 77 and 78 desirably arranged parallel and in spaced relation upon the outer face of said sleeve but insulated therefrom by appropriate insulating material shown at 79. The bands 77 and 78 are constantly engaged by spring pressed brushes 80 and 81, respectively, which are mounted in the housing 1 in insulating sleeves or bushings 82.

Springs 83 yieldingly retain said brushes in contact with their respective bands during the rotation of the latter. The outer ends of the brushes 80 and 81 are connected by wires 84 and 85 constituting a part of a motor controlling circuit and, by this arrangement, said motor controlling circuit will be closed when the sleeve 72 is revolving at a speed sufficient to retain the blades 76 of the centrifugal switches in contact with said bands, but the moment said sleeve slows down or stops, the springs 75 thereof act to withdraw the blades 76 from the bands and thereby open the motor controlling circuit with the result that the motor comes to a stop. By connecting the switch 61 with the said motor controlling circuit including the wires 84 and 85, it will be evident that, upon disconnecting the member 63 from the contacts 64 and 65, the motor will come to rest and that, by adjusting the abutment 63c or the said switch 61 or the standard 67, the stopping of said motor may be effected at just the desired moment.

Figure 5:
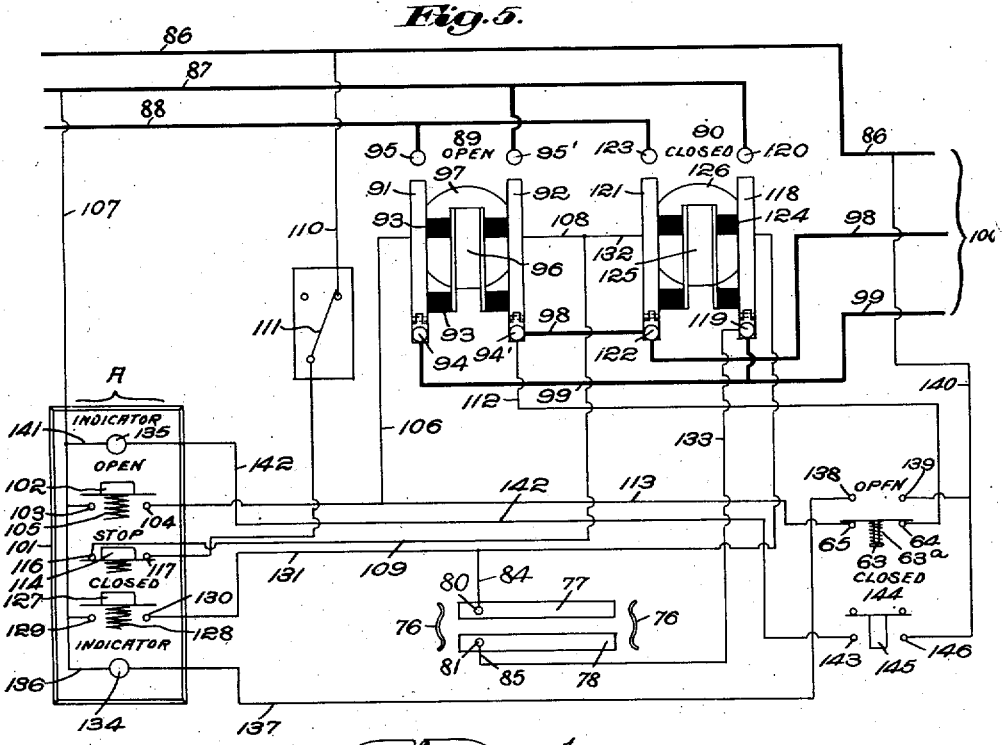
Fig. 5 is a diagram of the motor circuit wiring.

To obtain a clearer idea of the wiring of the motor controlling and feed circuits, a substantially complete electrical diagram is shown in Fig. 5. In this figure, 86, 87 and 88 constitute the three main wires of the motor circuit, herein a three phase system so-called. Inserted in said circuit, are magnetic reversing switches, herein two, 89 and 90. The switch 89 has blades 91 and 92 connected together by insulating sections 93 to operate simultaneously to electrically connect the two sets of terminals 94 and 95 and 94' and 95'. An armature 96, arranged between the blades 91 and 92, but insulated therefrom, is arranged to be acted upon herein by an electromagnet 97 to draw the blades 91 and 92 which are herein shown pivotally connected respectively with the terminals 94 and 94' into contact respectively with the terminals 95 and 95' and thereby close the motor circuit and supply current to the motor and, so long as the current continues to pass through the magnet 97, the switch 89 will remain closed and cause current to pass through the conductors 87 and 88, switch blades 91 and 92, conductors 98 and 99 to said motor to form the ends thereof indicated by the reference character 100 in said Fig. 5.

As previously stated, the initial starting of the motor 3 is effected by temporary circuit closing means, said means being preferably provided at a main control station which I have indicated at A, Fig. 5. At this station I provide, for convenience, a panel 101 wherein is mounted a push button 102 for connecting contacts 103 and 104. The push button 102 is normally held out of contact with said contacts by a spring 105. One of the contacts, herein 104, has connection, through a conductor 106, with the magnet 97. The other contact 103 is herein shown connected with a conductor 107, the latter extending to one of the main feed wires of the motor circuit, herein the wire 87. The other end of the coil of the magnet 97 is connected, through conductors 108, 109 and 110, with a second wire of said motor circuit, herein the wire 86 whereupon, when the push button 102 is pressed to connect the contacts 103 and 104, current will be supplied from the feed wires through the magnet 97, energizing the same and causing the magnetic switch, including the switch blades 91 and 92, to close the motor circuit through the switches 89 and 90 to the motor.

In the circuit including the push button 102, which I will designate as the motor starting circuit for opening the valve 38, I preferably insert a stop switch 111 which, when open, prevents starting of the motor from any other point, thus permitting work to be done upon said circuit and connected parts without danger of injury. This switch, however, is normally closed or, at least, it is closed by hand prior to the operation of the motor which may then be effected by closing the push button switch 102. It is obvious that the circuit, including said push button and the magnet 97, will remain closed only so long as pressure is maintained upon said push button.

Therefore, to supplement the push button switch 102, and to maintain the motor controlling circuit closed, after the initial closing has been effected, means herein including an automatic switch is operated to close the circuit including the magnet 97. This means preferably includes the switch blade 92 and a conductor 112, herein connected with one of the contacts of said blade, for example, the contact 94' so that, when said blade is moved to engage the contact 95' to close the motor circuit, current will pass from the feed wire 87, through said blade, conductor 112, and conductor 113, to the conductor 106, thence through the magnet 97, conductors 108, 109 and 110 to the other feed wire 86, thereby completing the motor controlling circuit through the magnet and short circuiting that portion of the starting circuit that includes the push button 102.

It will now be apparent that the magnet 97 will remain energized regardless of the opening of the switch 102, until other means are brought into play to open the motor controlling circuit to deenergize said magnet and cause the blades 91 and 92 to return to their open positions shown in Fig. 5. To accomplish the last mentioned function, I arrange in said motor controlling circuit, the limit switch 61 hereinbefore described as being operated by the valve stem 41 on its valve opening movement. This limit switch, shown in detail in Fig. 6 and in diagrammatic form in Fig. 5, is normally held in its closed position by spring means and, when in such position, completes the motor controlling circuit whereby the said magnet 97 will remain energized, even after pressure upon the push button 102 has been removed, until the limit switch 61 is opened by the valve stem 41 or by other means, for example, a stop switch 114 preferably arranged at the main controlling station A adjacent to the push button switch 102. The switch 114 may be, and herein is, shown as a push button switch that is normally held in its closed position by a spring 115 so as to connect contacts 116, 117 in circuit respectively with the conductors 109 and 110. By thus inserting the switch 114 in the circuit, including said electromagnet 97, it will be apparent that, by pressing said push button, the current to the magnet will be interrupted at any time in the operation of the motor if, for any reason, it is not desirable to allow the valve to open wide enough to engage the limit switch 61.

By referring to Fig. 5, it will be seen that the switch 89 is so arranged in the motor feed circuit that, when closed, the motor will be operated in one direction, that is, to open the valve 38. The other switch 90, on the other hand, is so arranged in said circuit that, when closed, it reverses the motor, for example, the feed wire 87 of the main supply circuit is connected through a switch blade 118 with the conductor 99 instead of with the conductor 98 as in the case of the switch 89. This switch blade 118 is herein pivotally connected with a terminal 119 of the wire 99 and is arranged to be moved into engagement with a terminal 120 for the conductor 87. A second switch blade 121, herein pivotally connected with a terminal 122 of the conductor 98, is adapted to be moved into engagement with a terminal 123 for the main conductor 88. The blades 118 and 121 are connected together by insulating cross members 124 and, herein carried by said cross members, is an armature 125 adapted to be attracted by an electromagnet 126 similar to the magnet 97.

The armatures 96 and 125 normally remain in their open positions either by gravity or any other appropriate means and are retained in their closed positions only during the energization of their respective magnets. The moment the current to either of said magnets is shut off, said switches will return to their open positions.

For convenience, the magnet 126 is connected with an operating switch at the main control station adjacent to the push button switches 102 and 114. This switch may be, and herein is, shown as a push button 127 and is normally retained in its open position by a spring 128 but is adapted to be moved into contact with terminals 129 and 130 connected herein respectively with conductor wires 107 and 131, which latter are in circuit with the feed wire 87 and with one side of the magnet 126. The other side of said magnet has a conductor 132 leading to the conductor 109 hereinbefore explained, through the normally closed switch 114 and switch 111, conductor 110, to a second wire 86 of the motor feed circuit whereupon, when the push button 127 is pressed, electric current will energize the magnet 126, attracting the armature 125 and causing the blades 118 and 121 to engage their respective terminals in said main feed circuit and transmit current to operate the motor 3 in a reverse direction to that hereinbefore explained.

In this case, as in the case with the push button 102, the circuit, including with the magnet 126, the element 131 connected with one side of said magnet, also elements 127 and 107, feed wires 87, 86, 110, 111, 114, 109 and 132 connected with the other side of the magnet 126 will remain closed so long as pressure is maintained upon the buttton 127. This button 127 is, however, provided merely to initiate the starting of the motor but, to maintain the same in operation, after pressure has been removed from the button 127, I herein employ one blade of the switch 90, for example, the blade 118 which serves, when closed, to supply current from the feed wire 87, through a circuit comprising elements 120, 118, 119, 133, 85; a centrifugal switch including eleemnts 81, 78, 76, 77 and 80; elements 84, 131; coil 126; elements 132, 109, 116, 114, 117; switch 111; conductor 110; and the other feed wire 86. Thus, if said centrifugal switch blades 76 are in contact with the plates 77 and 78 and the circuit is closed as it should be upon the initial starting of the motor the push button 127 will be short circuited. By means of this circuit called the motor control circuit, the electro-magnet 126 will remain energized at least until certain operations occur, to hold the switch 90 closed, thereby supplying current to the motor to close the valve 38.

During the valve closing operations, obstructions are very often encountered which would, if movement of the gate 40 thereof were not stopped, cause considerable damage to its operating devices. The same conditions will also exist when the gate 40 reaches its seat and, unless the driving mechanism is permitted to yield or the motor is stopped, something is likely to break. For the aforesaid reasons, the clutch hereinbefore described, including the disks 15 and 16, is interposed between the motor and the drive shaft 7, permitting the motor to continue in operation for a short time, at least, after the valve is seated or meets with predetermined resistance. The friction upon the blades 15 and 16 of said clutch is such as to cause the gate 40 to seat itself tightly and thereby completely shut off the flow through the conduit controlled thereby, this friction being determined by the pressure of the spring 23 upon said blades.

When the valve has become seated or has come to rest because of predetermined resistance encountered, the shaft 7 and with it the commutator sleeve 72, the centrifugal force whereof, during the rotation of said sleeve, caused the switch blades 76 to engage the bands 77 and 78, will no longer act to retain these parts in contact but will be overcome by the spring 75. The contact blades 76 will then withdraw from said rings and break the circuit including the terminal brushes 80 and 81. Herein said brushes are connected with the reversing motor controlling circuit through conductors 84, 85, 131 and 133 and the latter are, in turn, electrically connected with the magnet 126. This breaking of the motor controlling circuit by the withdrawal of said switch blades 76, deenergizes the magnet 126, allowing the switch blades 118 and 121 to return to their open positions and thereby shut off current to the motor 3.

When the main control station A is located at a remote distance from the valve as it usually is, it is desirable to provide indicators at said station to show whether the valve is open or closed. To this end, a light 134 is provided to show red, for example, when the valve 38 is open and a light 135 to show green when said valve is closed. To automatically operate the light 134, I herein provide a connection 136 extending from said light, through the conductor 107, to the main feed wire 87. A second conductor 137 extends from said indicator to a terminal 138 herein located with a similar terminal 139 in the path of the limit switch 61 so that, when said limit switch is moved by the valve stem 41, to open the motor circuit at the end of the valve opening movement, these terminals 138 and 139 will be electrically connected. To complete the indicator circuit, the terminal 139 has connection through a wire 140, with a second feed wire herein the wire 86, thus completing the circuit through the indicator 134 and causing the same to show red as hereinbefore stated when the valve has reached the selected stage in its opening movement.

The indicator 135 is connected by wire 141, through the conductor 107, with the main feed wire 87. A wire 142 also connects said indicator with one pole 143 of a normally open limit switch 144, herein held open by a spring 145. A second pole 146 of said switch has connection with the conductor 140 leading to the feed wire 86. Any appropriate limit means may be provided to close the switch 144 when the valve reaches its closed position and thus indicate this fact at the remote control station. The switch 144 is, for convenience, arranged in the path of an abutment 147 herein adjustably mounted upon the extension 62 of the valve stem 41, so that, when the latter is in its retracted position representing the closed position of the valve gate 40 (see Fig. 6), it will have moved said switch 144 into contact with the terminals 143 and 146 and maintain it in this position so long as the valve remains closed.

From the foregoing description, it will be apparent that, among other functions, the driven device, herein embodying a gate valve may be operated either manually or by power; that the power operating instrumentalities may be set in motion in either direction by the manual closing of switches, thereby supplying current to the operating motor and, at the same time, bringing into play, motor controlling devices which supplement the starting devices and maintain the motor in operation for selected or predetermined periods and, when these periods have terminated, in automatically bringing the motor to a stop. Furthermore the meeting of an obstruction, which offers predetermined resistance at any intermediate stage in the operation of the device, not taken care of by the limit devices, automatically brings into play instrumentalities which also cause the motor to stop before injury is done to the driving mechanism; or the motor may be manually stopped at any stage and again started from that point to operate in either direction regardless of the direction in which it was then running.

Although I have disclosed and discussed in detail one full and complete embodiment of my invention, it is to be understood that the invention is not limited thereto.

I claim:

1. In an apparatus of the class described, a valve, motor operating means for said valve, positive driving means for opening said valve including a ratchet, friction closing means arranged to slip when said valve meets an obstruction, and centrifugal switch means operated by said motor.

2. In combination, a valve, operating means for said valve, positive driving means interposed between said operating means and said valve for effecting movement thereof in one direction, slip drive means interposed between said operating means and said valve, adapted to yield when the valve encounters an obstruction at any point in the operation thereof in an opposite direction, and centrifugal means functioned by said operating means after said valve has come to a stop, to cut off power to said operating means.

3. In combination, a valve, power operating means for said valve including a motor, and means interposed between said motor and said valve including a centrifugal switch, for automatically shutting off the current to said motor following the application of a predetermined closing tension to said valve.

4. In combination, a valve, a motor for operating said valve, limit means controlled by said motor for stopping said valve at one limit of its movement, centrifugal means for stopping said valve at substantially any stage of its operation toward the other limit thereof, and indicators arranged at a remote distance from said valve to indicate when said opposite limits are reached.

5. In a device for operating valves, in combination, a motor, a driven member, friction driving means interposed between said motor and said driven member to slip when predetermined resistance to operation of said driven member is encountered, and motor control devices rendered effective upon a predetermined deceleration of said driven member to stop said motor.

6. In a device for operating valves, in combination, a motor, a driven member, a friction clutch interposed between said motor and said driven member to slip when predetermined resistance is encountered, a motor controlling circuit, and a centrifugal switch arranged to be operated by said clutch when the latter is rotating at a selected speed to maintain said motor controlling circuit closed, said switch being arranged automatically to open said controlling circuit upon predetermined slipping of said clutch.

7. In a device for operating valves, in combination, a motor, a driven member, a friction clutch interposed between said motor and said driven member to slip when predetermined resistance is encountered, a motor controlling circuit, a centrifugal switch arranged to be operated by said clutch when the latter is rotating at a selected speed to maintain said motor controlling circuit closed, said switch being arranged automatically to open said controlling circuit upon predetermined slipping of said clutch, and means including said friction clutch to stop further movements of said motor when said controlling circuit is opened.

8. In a device for operating valves, in combination, an electric motor, a main feed circuit for said motor, a controlling circuit for said motor, a starting circuit for said motor, a driven member, friction driving means interposed between said motor and said driven member, manually operable switch means for closing said starting and main feed circuits, automatic switch means arranged automatically to close with the closing of said main feed circuit, and centrifugal switch means normally operated by said friction driving means, to maintain said controlling circuit closed but arranged, upon a predetermined slipping of said friction clutch and a consequent reduction in centrifugal force thereof, to open said controlling circuit and stop said motor.

9. A device for operating valves, including a reversible motor, a feed circuit for said motor, manual switch means to start said motor in either direction, manual switch means to stop said motor at any stage of its operations in either direction, centrifugal switch means automatically operated upon the closing of said feed circuit to supplement said manual switch means in maintaining said feed circuit closed, and means to stop said motor at selected stages of its operation.

10. A device for operating valves, including a reversible motor, a feed circuit for said motor, manual switch means to start said motor in either direction, manual switch means to stop said motor at any stage of its operations in either direction, centrifugal switch means automatically operated upon the closing of said feed circuit to supplement said manual switch means in maintaining said feed circuit closed, limit switch means to stop said motor at selected stages of its operation, and means effectual upon the encountering of predetermined resistance to the operations of said motor, to stop the same.

11. The combination with a valve mechanism, of a motor for actuating the same, a torque limiting coupling connecting said mechanism and motor, and centrifugal means for automatically de-energizing said motor when slippage occurs in the torque limiting coupling.

12. A valve-operating mechanism comprising a valve, a drive mechanism therefor, a motor for actuating said drive mechanism, a friction clutch interposed between said motor and said mechanism, and a centrifugal switch connected to the latter to stop said motor when slippage occurs in the friction clutch.

13. A valve-operating mechanism comprising a drive shaft for engaging the valve to be operated, a motor connected to the drive shaft by means of a friction coupling, a power supply circuit for the motor, a centrifugal switch associated with the drive shaft for completing the motor supply circuit while the drive shaft is turning and switch means for shunting the centrifugal switch to start the motor.

14. A valve-operating mechanism comprising a valve, a gear wheel operatively connected with said valve, a drive shaft cooperatively engaged with said wheel, a motor coupled with said drive shaft, a friction clutch and a delayed motion device respectively arranged to transmit valve opening and closing movements from said motor to said gear wheel, a normally open centrifugal switch mounted on said drive shaft, an electric control circuit for said motor including said centrifugal switch, means for engaging said motor, and means utilizing centrifugal force for opening and closing said switch.

15. A valve-operating mechanism comprising, in combination, a valve, a gear wheel operatively connected with said valve, a drive shaft cooperatively engaged with said gear wheel, a motor coupled with said drive shaft, a friction clutch including a delayed motion device for connecting said motor and drive shaft and adapted, upon the slipping of said clutch, to produce a hammer-like blow to start said valve, a centrifugal switch mounted on said drive shaft, and an electric circuit including said centrifugal switch for controlling operations of said motor.

16. A valve-operating mechanism comprising a valve, a drive shaft for transmitting movement to said valve, a motor, a friction clutch having driving and driven members for connecting said motor with said drive shaft, a delayed motion device interposed between the driving and driven members of said friction clutch to limit slippage between said members in one direction, a centrifugal switch effective upon the slowing down of said drive shaft to stop said motor, an electric circuit including said centrifugal switch cooperating to contact said motor with a source of electrical energy, and means for shunting said centrifugal switch to start said motor.

17. A valve-operating mechanism comprising a drive shaft for cooperatively engaging the valve to be operated, a reversible motor, a friction clutch for connecting said motor and drive shaft, a centrifugal switch mounted on said drive shaft for stopping the motor when the drive shaft stops, an electric circuit including said switch for controlling the circuit to said motor, and means for shunting said centrifugal switch.

18. A valve-operating mechanism comprising a drive shaft for cooperatively engaging the valve to be operated, a reversible motor, a friction clutch for connecting said motor and drive shaft, a centrifugal switch mounted on said drive shaft for stopping the motor when the drive shaft stops, an electric circuit including said switch for controlling the circuit to said motor, and means for shunting said centrifugal switch to start said motor in a forward direction.

19. A valve-operating mechanism comprising a drive shaft for cooperatively engaging the valve to be operated, a reversible motor, a friction clutch for connecting said motor and drive shaft, a centrifugal switch mounted on said drive shaft for stopping the motor when the drive shaft stops, an electric circuit including said switch for controlling the circuit to said motor, and means for shunting said centrifugal switch to start said motor in a reverse direction.

20. A valve-operating mechanism comprising a drive shaft operatively connected with the valve, a motor, a centrifugal switch for controlling the motor, a magnetic switch in circuit with said motor, an electric circuit including said centrifugal switch and the coil of said magnetic switch, and means to shunt said centrifugal switch.

21. A valve-operating mechanism comprising a drive shaft operatively connected with the valve, a reversible motor, a friction clutch for connecting said motor with said drive shaft, forward and reverse electric motor circuits each including a magnetic switch, manual means to close said forward and reverse circuits, and means in circuit with one of said motor circuits arranged automatically to shunt one of said manually closed circuits when said shaft has attained a predetermined speed.

22. A valve-operating mechanism comprising a reversible motor, forward and reverse circuits for said motor, manually operable starting switches for each of said circuits, a drive shaft operated by said motor, a magnetic switch for each of said circuits, and a centrifugal switch on said shaft and in circuit with one of said magnetic switches arranged to shunt one of said manually operable switches when said drive shaft has obtained a predetermined speed.

23. A valve-operating mechanism comprising a valve, a gear wheel operatively connected with the valve stem, a drive shaft operatively connected with said gear wheel, a motor coupled with said drive shaft, a friction clutch including a delayed motion device for connecting said motor and drive shaft, a centrifugal switch mounted on said drive shaft, a motor circuit controlled by said centrifugal switch, arranged to be closed when said drive shaft is operating at a selected speed, and means to open said circuit upon the stopping of said shaft.

CHARLES R. KELTY.